Figure 4:
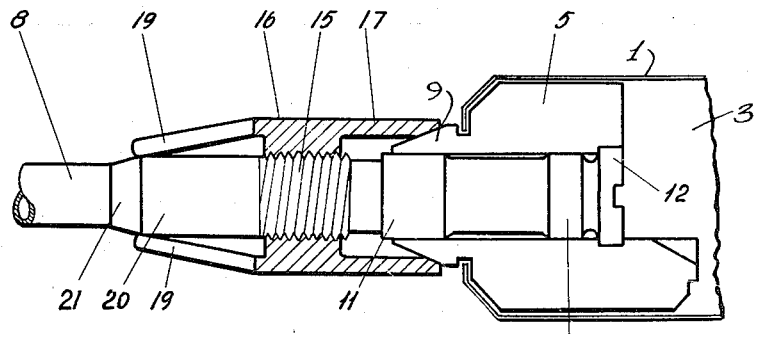

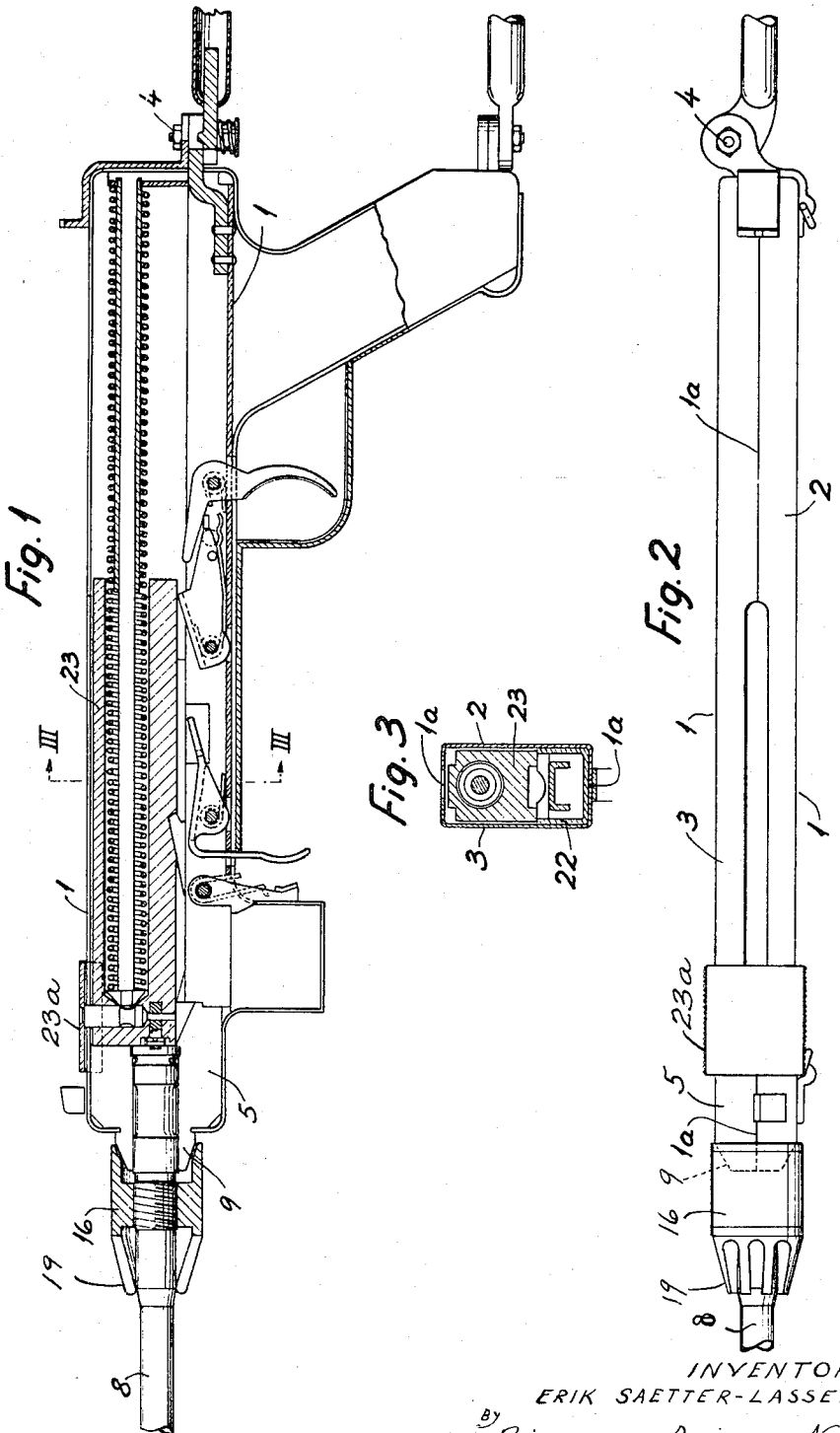

2,749,642
Patented June 12, 1956

2,749,642
MACHINE PISTOLS
Erik Saetter-Lassen, Hellerup, Denmark

Application January 10, 1952, Serial No. 265,865

4 Claims. (Cl. 42—75)

The invention relates to novel and valuable improvements in and relating to machine pistols.

The object of the invention is to provide a machine pistol suitable for mass production, with low costs of production, easy to disassemble and reassemble and reliable to use.

Another object of the invention is to provide a machine pistol which may be assembled by means of a single screw fitting, which when screwed into place will keep the parts together and automatically adjust their alignment.

Other objects of the invention and its advantages and special characteristics will appear from the embodiments shown in the attached drawings of a machine pistol and the appurtenant parts, from the specification and claims.

Figure 5:
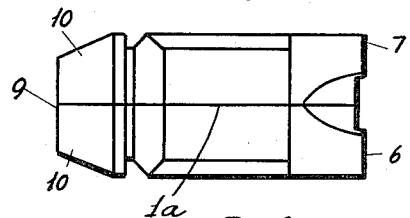
Figure 6:
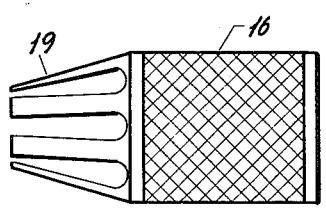
Figure 7:
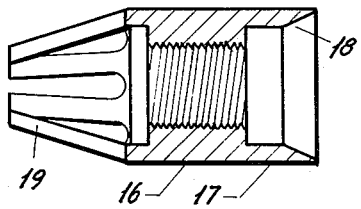
Figure 8:
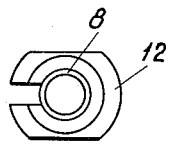
Figure 9:
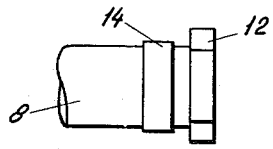
Figure 10:
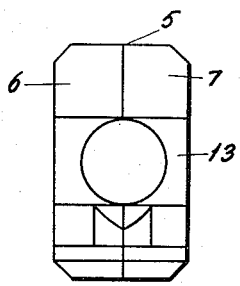
Figure 11:
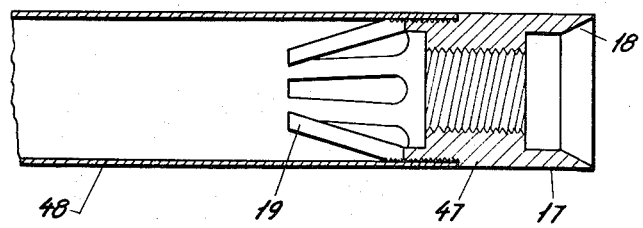

In the drawing:

Fig. 1 shows a longitudinal section through a machine pistol according to the invention, Fig. 2, the pistol seen from above, Fig. 3, a cross-section on line III—III in Fig. 1, Fig. 4, an enlarged scale a vertical, longitudinal section through the forward part of the receiver and the rear part of the barrel with socket, Fig. 5, the two halves of the bearing block folded together and viewed from above, Fig. 6 the socket in side elevation, Fig. 7, the same in cross-section, Fig. 8, the barrel seen from the rear, Fig. 9, the rear part of the barrel seen from above, Fig. 10, the bearing block seen from the rear, Fig. 11, an alternative embodiment of the socket, Figs. 1 and 2 show the receiver 1 consisting of a lefthand half 2 and a righthand half 3, made of sheet metal and hinged at the rear by a hinge 4, so that they may be swung apart in the horizontal plane and the receiver may thereby be opened. In closed position the two halves abut along the line 1a, Figs. 2 and 3.

To the front of the receiver and forming part of this, a bearing block 5 is affixed, consisting of two halves 6 and 7, each fastened to one half of the receiver (parts 2 and 3, respectively), and when folded together forming a bearing for a barrel 8, as will appear in detail from Figs. 4 and 5. The bearing block is in front made in special shape and will in folded condition form a stub 9, protruding from the receiver and having a conical external surface 10.

The part of the barrel encased by the stub 9 is provided with an annular reinforcement 11, forming a bearing surface for the interior, cylindrical surface of the stub. To the rear the barrel has a lateral, protruding collar 12, see Figs. 8 and 9, fitting into a corresponding recess 13 in the rear of the bearing block, see Fig. 10. This collar 12 prevents the barrel 8 from being pulled forward out of the receiver. The barrel is further provided with an annular reinforcement 14, forming a bearing surface for the internal, cylindrical surface of the bearing block 5. On its part immediately forward of the receiver the barrel has threaded reinforcement 15, see Fig. 4, on which is screwed from the forward end of the barrel a socket 16 with internal threads, see Fig. 7, and with an extension 17 protruding towards the receiver and forming an internal, conical surface 18, which by co-operating with the conical surface of the stub 9 forces the two halves of the receiver being hinged together at their rear ends firmly together when the socket is screwed inwards, the collar 12 preventing the barrel from being pulled out of the receiver.

The socket is at its opposite end provided with elastic webs 19 projecting in the axial direction and pressing resiliently against a reinforcement 20, situated in extension of reinforcement 15 and by a conical part 21, merging into the forward, thinner part of the barrel. The pressure of the webs 19 against the reinforcement 20 of the barrel will prevent loosening or inadvertently unscrewing of the socket 16, and this effect may be improved by roughening or knurling the surface of reinforcement 20.

To the righthand half of the receiver, see Fig. 3, is welded or otherwise affixed a channel-shaped plate 22, the upward flanges of which form guides for the breech bolt 23 of the pistol. This breech bolt is of square cross-section.

Fig. 11 shows a special embodiment of a socket 47 corresponding to socket 16. The former socket is like socket 16 provided with threads to screw on to the threaded reinforcement 15 on the barrel and has a rearward extension 17, with a conical, internal surface 18 and forward protruding resilient webs 19, but socket 47 is besides provided with a forward pipe-extension 48, enclosing the barrel 18 as a jacket. Thus in a simple manner an easily detachable jacket is obtained which at all times will be coaxial with the barrel, so that sights placed on the jacket at all times will be situated in the same position in relation to the axis of the barrel.

What I claim is:

1. In a machine pistol, a sliding breech block, a sheet metal receiver forming a sleeve bearing for said block and divided by a longitudinal vertical section into two longitudinally abutting halves hinged together at their rear ends, said halves at their front ends forming a forward protruding stub presenting a forwardly tapering conical external surface and having internal bearing surfaces, a barrel having a rear portion encircled and supported by said internal bearing surfaces of said stub, said barrel being provided with an externally threaded reinforcement over a portion of its outer cylindrical surface situated in front of said stub, and an internally threaded socket engaging the threads of said enforcement and including a non-threaded extension presenting an internal conical surface engaging the conical external surface of said forward protruding stub thus forcing said two halves of the receiver to be held pressed against each other, whereby upon advancing said socket forwardly of said stub by means of the threads the internal conical surface of said socket disengages the external conical surface of said stub to thereby permit said halves to be hingedly separated from each other thus affording access to said block.

2. In a machine pistol according to claim 1, the socket engaging the threaded reinforcement of the barrel at its end opposite the extension engaging said forward protruding stub being provided with a plurality of axially extending resilient webs arranged along the circumference of said socket, said webs when the socket is screwed on to said reinforcement of the barrel pressing resiliently against the surface of said barrel so as to prevent inadvertent unscrewing of said socket.

3. In a machine pistol according to claim 2, said socket at its end provided with said resilient webs being further provided with a pipe-extension coaxial with said socket, said pipe-extension forming a jacket for the barrel of the machine pistol.

4. In a machine pistol according to claim 1, the socket engaging the threaded reinforcement of the barrel at its end opposite the extension engaging said forward protruding stub being provided with a pipe-extension coaxial with said socket, said pipe-extension forming a jacket for the barrel of the machine pistol.

References Cited in the file of this patent

UNITED STATES PATENTS 529,455     Marlin _____ Nov. 20, 1894

FOREIGN PATENTS 434,220     Great Britain _____ Aug. 28, 1935